455-296 SR
FIP8106 XR 2,904,677
[redacted]
X 5495P
SEARCH ROOM

Sept. 15, 1959 R. W. A. HEIDESTER 2,904,677

DIVERSITY ANTENNA SELECTION SYSTEM

Filed Nov. 12, 1957

Inventor:
Rudolf W.A. Heidester
By [signature]
Patent Agent

United States Patent Office 2,904,677 Patented Sept. 15, 1959

2,904,677

DIVERSITY ANTENNA SELECTION SYSTEM

Rudolf W. A. Heidester, Ulm (Danube), Germany, assignor to Telefunken G.m.b.H., Berlin, Germany Application November 12, 1957, Serial No. 695,822

Claims priority, application Germany November 17, 1956

5 Claims. (Cl. 250—20)

The present invention relates to antenna selection systems for use in diversity receiving systems.

It has been known to use a multi-diversity receiving system to void fading in radio reception. In such systems, the signals are transmitted via several channels but, generally, only the signal received via one of the channels is utilized, i.e., the strongest signal. In the simplest case of the socalled diversity-receiving system, two mutually spaced antennas of the same construction are used, each of these antennas being connected to a separate receiver. This socalled receiver-selection system operates in such a way, that always the strongest of the two signals is automatically selected and passed to the output of the associated receiver.

Furthermore, a socalled antenna-selection system has been known (see article "An Analysis of Dual Diversity Receiving Systems," by Arthur H. Hausmann, in Proceedings IRE of June 1954, pages 944 to 947), in which several antennas, but only a single receiver, are employed. In this case, the antenna operating under the most favorable receiving conditions is automatically connected to the input of the receiver.

Either relays, as disclosed in U.S. Patent No. 2,243,118, or amplifier tubes, as disclosed in U.S. Patent No. 2,059,-081, may be used for effecting the automatic selection. Generally, relays cannot be used in this case, due to their great inertia. Amplifier tubes are applicable only in the low frequency or intermediate frequency circuits, because the inherent tube noise is not important in these circuits and in these circuits, there is no risk of cross talk. The expense is relatively high for circuits using amplifier tubes.

It is an object of the present invention to provide a selection apparatus without relays or amplifier tubes which apparatus is particularly suited for antenna-selection-type systems, such as mentioned in the foregoing, in which the selection takes place between the antennas and the common receiver in the high frequency circuits.

It is another object of the invention to provide in a multi-diversity receiving apparatus two diodes connected in push-pull and associated with each of the antennas, said diodes acting as switches. These diodes are instantaneously rendered conductive from a non-conductive condition by application of a control voltage and vice versa. These diodes are inserted between the secondaries of the transformers fed by the antennas, and are connected in push-pull to the primary of a single transformed feeding the input to the receiver. The control voltage is applied between the center tap of the secondary of each antenna transformer and the center tap of the primary of the receiver transformer. The internal capacities of the diodes are neutralized by condensers inserted crosswise between each antenna transformer and the receiver transformer, across the diodes.

Transient noises of the selecting by such diode switching is avoided by using a push-pull circuit in a manner used in other control circuits. The neutralization prevents antenna energy from being conducted to the receiver through the capacities of the blocked diodes.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
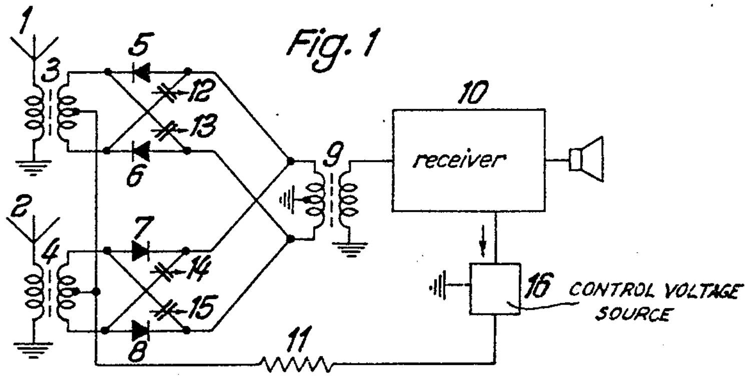
Figure 1 shows schematically a circuit diagram of a first embodiment of this invention, using two antennas.

In Figure 1, two mutually spaced receiving antennas 1 and 2 operating under different receiving conditions are each connected to one of the transformers 3 and 4, respectively, the secondaries of which are arranged in push-pull. Selection of the upper antenna takes place via the upper channel including two diodes 5 and 6, while selection of the lower antenna via the lower channel is carried out by two diodes 7 and 8. The two channels are combined at the primary of a transformer 9, the secondary of which is connected to a receiver 10. Control voltages are fed to the center taps of the transformers 3 and 4, said control voltages serving to switch the conductivity of the pairs of diodes 5 and 6 or 7 and 8 to select one antenna or the other.

In the foregoing example, only a single control voltage supplied via a resistance 11 is necessary, because the diodes 7 and 8 are of opposite polarity from the diodes 5 and 6. If the control voltage is negative, the upper channel is conductive and the lower blocked while, in case of positive control voltage, the upper channel is blocked and the lower conductive. The control voltage may, for example, be derived from the automatic volume control voltage of the receiver with the aid of a trigger stage 16 in a manner similar to that shown in U.S. patent No. 2,243,118. In such case, the switching takes place when the control voltage falls below a certain threshold value. This threshold value is fixed at such a level that, when the control voltage falls to the threshold value, the input voltage is still sufficient to provide satisfactory signal transmission, for example, the probability of error will not be excessive during a transmission.

In order to prevent the antenna voltage from being transmitted to the receiver via the internal capacities of blocked diodes, these capacities are rendered ineffective by a neutralization circuit using pairs of adjustable condensers 12 and 13, or 14 and 15, respectively.

Figure 2:
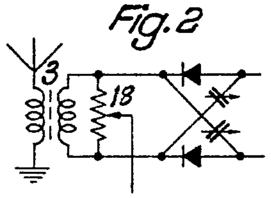
Figure 2 is a fragmentary view of a circuit diagram showing a modification of the circuit according to Figure 1.

A potentiometer 18, as shown in Figure 2, may be used in a known manner to obtain a symmetrical circuit arrangement, such potentiometers being shunted across the secondaries of the antenna transformers 3 and 4 and each having a movable tap or wiper arm serving in place of the fixed transformer center tap. These movable taps are adjusted in such a manner that no transient noise will be heard during the switching-over.

Figure 3:
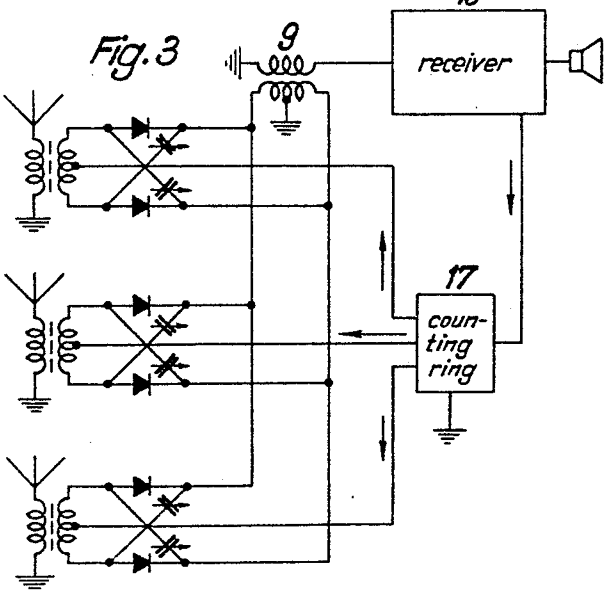
Figure 3 illustrates schematically a circuit diagram of an embodiment according to the invention using three antennas.

The selection device according to the invention can be applied also to receiving systems using three or more antenna channels. Figure 3 shows an embodiment of the invention having three antennas and a common receiver. The pairs of diodes in the individual antenna feed lines all have the same polarity. A ring-counter 17, known per se in the electronic computer technique (see article "Transistor Shift Register," by Baker, Lebow, McMahon, in Proceedings IRE of July 1954, pages 1152–1159), is controlled by the receiving conditions and has as many switching positions as there are antennas, whereby this ring-counter 17 furnishes control voltages which are polarized in such a manner that one of the antenna feed lines is rendered conductive while the others are rendered non-conductive. Another example of a ring-counter is disclosed in an article entitled "Flip-Flop Counter Has Expanded Range," by Howard Backwith in "Electronics" Magazine of January 1955, at pages 149 to 151.

I claim:

1. In a diversity receiving system including a receiver and including at least two mutually spaced antennas, antenna-selection means comprising an input transformer connected to said receiver and having a primary winding; one coupling transformer connected with each antenna and each coupling transformer having a secondary winding, and switching means connected between said primary winding and each of said secondary windings, each switching means comprising a pair of diodes connected in push-pull between a secondary winding and said primary winding; and a control voltage source connected between said primary winding and each of said secondary windings and selectively biasing one pair of diodes forwardly while reverse-biasing the other diodes to render them non-conductive; and two adjustable condensers connected in mutually crossed relation across each pair of push-pull diodes and adjusted to neutralize the internal diode capacities.

2. In a system as set forth in claim 1, said primary winding and said secondary windings being center-tapped and said control voltage source applying bias between said center taps.

3. In a system as set forth in claim 1, potentiometers applied across said secondary windings, said potentiometers having taps intermediate their ends, said control voltage source being connected between said primary winding and the potentiometer taps to bias the diodes, and said taps being movable wiper arms adjustable to the optimum position at which no transient switching noise occurs during switching of the conductivity of said pairs of diodes.

4. In a system as set forth in claim 1, said system including two antennas, and one pair of switching means associated with each antenna, the diodes of one pair being connected so that their direction of conductivity is opposite to the direction of conductivity of the diodes of the other pair, and said control voltage source applying the same polarity across both pairs, whereby the pairs will be oppositely biased.

5. In a system as set forth in claim 1 and including at least three antennas, said control voltage source comprising a ring-counter circuit having an output connected with each of said secondary windings, and the polarity of the voltage from one output being opposite to the polarity of the voltages from the other outputs.

References Cited in the file of this patent

UNITED STATES PATENTS

| | | |
|---|---|---|
| 2,059,081 | Beers | Oct. 27, 1936 |
| 2,243,118 | Peterson | May 27, 1941 |
| 2,456,494 | Ensink | Dec. 14, 1948 |
| 2,729,741 | Chapman | Jan. 3, 1956 |

FOREIGN PATENTS

| | | |
|---|---|---|
| 525,166 | Great Britain | Aug. 22, 1940 |